US012585103B2

(12) United States Patent
Hariyama et al.

(10) Patent No.: US 12,585,103 B2
(45) Date of Patent: Mar. 24, 2026

(54) IMAGE CAPTURING UNIT AND ENDOSCOPE

(71) Applicant: OLYMPUS MEDICAL SYSTEMS CORP., Hachioji (JP)

(72) Inventors: Takaaki Hariyama, Tokyo (JP); Tetsuta Hanawa, Hachioji (JP); Yuki Ito, Hachioji (JP); Tatsuya Daimaru, Hino (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/749,039

(22) Filed: Jun. 20, 2024

(65) Prior Publication Data

US 2024/0427136 A1     Dec. 26, 2024

Related U.S. Application Data

(60) Provisional application No. 63/509,565, filed on Jun. 22, 2023.

(51) Int. Cl.
*G02B 23/24* (2006.01)
*H04N 23/50* (2023.01)

(52) U.S. Cl.
CPC ..... *G02B 23/2484* (2013.01); *G02B 23/2461* (2013.01); *H04N 23/555* (2023.01)

(58) Field of Classification Search
CPC ............ G02B 23/2484; G02B 23/2461; H04N 23/555

See application file for complete search history.

(56) References Cited

U.S. PATENT DOCUMENTS

| | | | | |
|---|---|---|---|---|
| 2009/0122574 A1* | 5/2009 | Ogawa | ..................... | A61B 1/07 362/574 |
| 2016/0037029 A1* | 2/2016 | Igarashi | ................. | H04N 23/51 348/65 |
| 2019/0068859 A1* | 2/2019 | Numasawa | ........ | A61B 1/00126 |
| 2024/0412970 A1* | 12/2024 | Imai | ....................... | H10B 43/20 |

FOREIGN PATENT DOCUMENTS

JP        2019-195382 A      11/2019

* cited by examiner

*Primary Examiner* — Nasim N Nirjhar
(74) *Attorney, Agent, or Firm* — WHDA, LLP

(57) ABSTRACT

The present invention includes an imager, a cable that coats a cable core wire for performing at least one of inputting and outputting of signals between the imager and outside and supply of power to the imager from the outside, a first substrate that connects the imager to a first surface, and a second substrate that is connected to a first connection part different from a connection position of the imager on a second surface opposite to the first surface of the first substrate. In the cable core wire, relative to the second surface of the first substrate, at least part of a second connection part connected to the second substrate is positioned on a side opposite to a direction in which an image capturing surface of the imager is directed.

10 Claims, 3 Drawing Sheets

IMAGE CAPTURING UNIT AND ENDOSCOPE

BACKGROUND OF THE INVENTION

Field of the Invention

The present invention relates to an image capturing unit and an endoscope.

Description of Related Art

In the related art, side viewing endoscopes such as duodenoscopes, for example, having a structure with an imager disposed in a direction in which an image capturing surface lies along a longitudinal direction of the endoscope are known. In endoscopes having such a structure, as described in Patent Document 1, a flexible board is connected to a rear surface of an imager, a circuit related to inputting and outputting signals and power of the imager is disposed on the flexible board, and a cable is soldered to a rear end of the flexible board.

Therefore, as endoscopes become smaller in diameter and imager circuit components become smaller in size, if a solder connection part 51A of a cable is close to an outer circumferential surface of an endoscope and the imager circuit components, there is a possibility that inputting and outputting in an imager will be affected by static electricity from the outside. Due to such a constitution, it is desired to be able to improve the electrostatic resistance of imager related components, and there is room for improvement in this respect.

Patent Document

[Patent Document 1] Japanese Unexamined Patent Application, First Publication No. 2019-195382

SUMMARY OF THE INVENTION

An image capturing unit according to a first aspect of the present invention includes an imager, a cable that coats a cable core wire for performing at least one of inputting and outputting of signals between the imager and outside and supply of power to the imager from the outside, a first substrate that connects the imager to a first surface, and a second substrate that is connected to a first connection part different from a connection position of the imager on a second surface opposite to the first surface of the first substrate. In the cable core wire, relative to the second surface of the first substrate, at least part of a second connection part connected to the second substrate is positioned on a side opposite to a direction in which an image capturing surface of the imager is directed.

An endoscope according to a second aspect of the present invention includes the image capturing unit described above that is provided in an endoscope insertion portion distal end.

DETAILED DESCRIPTION OF THE INVENTION

First Embodiment

An image capturing unit and an endoscope according to a first embodiment of the present invention will be described with reference to FIGS. 1 and 2.

Figure 1:
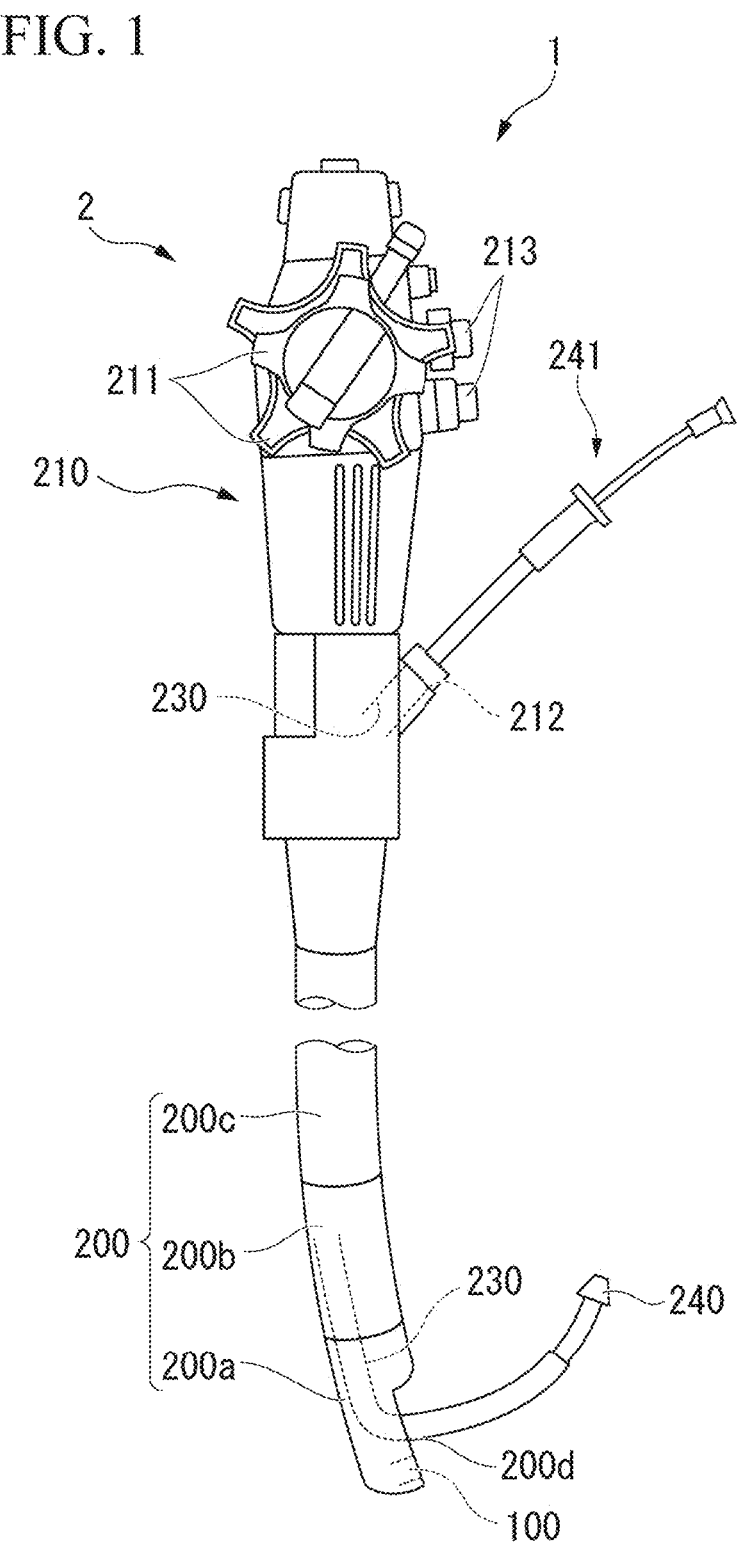
FIG. 1 is a perspective view of an endoscope system according to a first embodiment.

FIG. 1 is a perspective view illustrating an overall constitution of an endoscope system 1.

As illustrated in FIG. 1, the endoscope system 1 includes an endoscope 2 which is inserted into a subject, captures images of the inside of the body of the subject, and generates image signals of the inside of the subject.

The endoscope 2 is a device which is provided with an image capturing unit 100 in an endoscope insertion portion distal end and observes or treats an affected part inside the body. The endoscope 2 is a strabismus-type endoscope for observing the inside of a subject in an oblique direction and includes an insertion portion 200 which is inserted into a subject, an operation portion 210 which is on a proximal end portion side of the insertion portion 200 and is gripped by a physician, and a flexible universal cord (illustration omitted) which extends beyond the operation portion 210. In the present embodiment, the endoscope 2 is a soft endoscope, but the endoscope 2 may also be a different type of endoscope (for example, a rigid endoscope or an ultrasound endoscope).

In the endoscope system 1, an image signal captured by the endoscope 2 is subjected to predetermined image processing, each portion of the endoscope system 1 is controlled by an information processing device (not illustrated), and an image signal after image processing by the information processing device is displayed as an image by a display device (not illustrated).

The insertion portion 200 is realized using an illumination fiber, an electric cable, an optical fiber, and the like. The insertion portion 200 has a distal end portion 200a which has the built-in image capturing unit 100 (which will be described below), a bending portion 200b which is provided on a proximal end side of the distal end portion 200a and can perform a bending operation, and a flexible tube portion 200c which is provided on the proximal end portion side of the bending portion 200b and has flexibility. The distal end portion 200a is provided with a light guide cable which illuminates the inside of a subject via an illumination lens, an observation portion which captures images of the inside of a subject, an opening portion communicating with a treatment tool channel, and an air/water feeding nozzle. The image capturing unit 100 having a light guide and a CCD is provided on a side surface of the distal end portion 200a and is exposed to the outside.

The bending portion 200b is bendable in a vertical direction and a lateral direction. A distal end of an operation wire is fixed to the distal end side of the bending portion 200b. The operation wire extends to the operation portion 210 through the inside of the insertion portion 200.

The operation portion 210 has a bending knob 211 which bends the bending portion 200b in the vertical direction and the lateral direction, a treatment tool insertion portion 212 (which has been described above) through which a treatment tool such as living body forceps or a laser scalpel is inserted into a body cavity of a subject, and a plurality of switch portions 213 which perform an operation of peripheral instruments (not illustrated) such as the information processing device, a light source device, an air feeding device, a water feeding device, and a gas feeding device. A treatment tool 240 inserted through the treatment tool insertion portion 212 comes out from an opening portion 200*d* of an insertion portion distal end via a treatment tool channel 230 provided therein. A user can bend the bending portion 200*b* in a desired direction by operating the bending knob 211.

The treatment tool channel 230 for inserting an endoscope treatment tool therethrough is formed in the treatment tool insertion portion 212. The distal end of the treatment tool channel 230 can protrude from the opening portion 200*d* opening on a side surface of the distal end portion 200*a*. A proximal end portion of the treatment tool channel 230 extends to a treatment tool operation portion 241.

The universal cord is constituted using an illumination fiber, a cable, and the like. The universal cord can be attached and detached with respect to the information processing device. The universal cord propagates illumination light emitted from the light source device to the distal end portion 200*a* via the illumination fiber. In addition, the universal cord transmits an image signal captured by the image capturing unit 100 (which will be described below) to the information processing device via the cable and a connector.

Next, a constitution of the image capturing unit 100 provided in the distal end portion 200*a* of the endoscope 2 will be described in detail.

Figure 2:
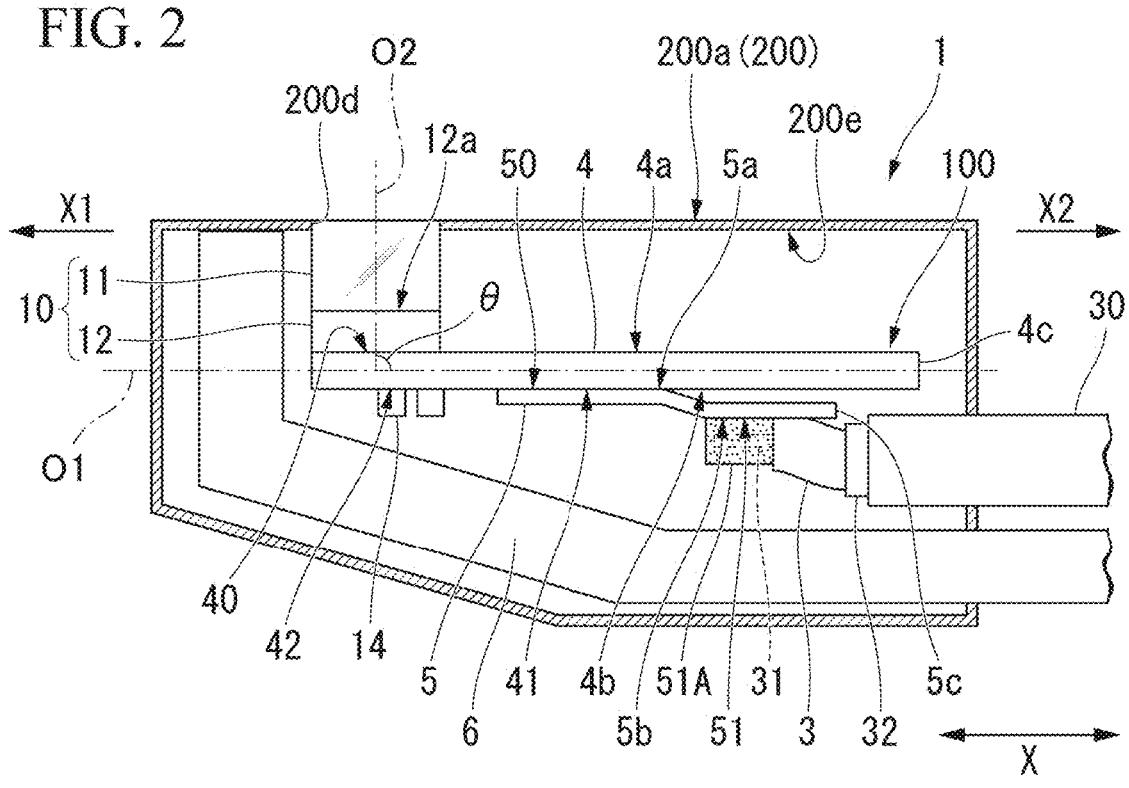
FIG. 2 is a cross-sectional view of an image capturing unit of an endoscope according to the first embodiment.

FIG. 2 is a cross-sectional view of the image capturing unit 100 according to the first embodiment of the present invention.

Here, in the distal end portion 200*a* of the endoscope 2, an opening side of the side surface will be referred to as an upward side and a side opposite thereto will be referred to as a downward side in the following description. In addition, an extending direction of the endoscope 2 will be referred to as an axial direction X, a distal end portion side in the axial direction X will be referred to as a distal end side X1 (insertion portion distal end side), and a side opposite to the distal end side X1 will be referred to as a proximal end side X2 (insertion portion proximal end side) in the following description.

As illustrated in FIG. 2, the image capturing unit 100 has an imager 10, a cable 3 which coats a cable core wire 31 for performing at least one of inputting and outputting of signals between the imager 10 and outside and supply of power to the imager 10 from the outside, a hard substrate 4 (first substrate) which connects the imager 10 to an upper surface 4*a* (first surface), a flexible board 5 (second substrate) which is connected to a flexible board connection portion 41 (first connection part) different from a connection position of the imager 10 on a lower surface 4*b* (second surface) opposite to the upper surface 4*a* of the hard substrate 4, and a light guide component 6 which guides light emitted to an image capturing target of the imager 10.

The light guide component 6 extends in the axial direction X below the hard substrate 4 and the flexible board 5 and is disposed in a manner of being bent upward on the distal end side X1. The hard substrate 4 and the flexible board 5 are disposed while covered by the light guide component 6 from below and the distal end side X1.

The imager 10 includes a lens unit 11 which has a plurality of objective lenses, and an image capturing element 12 which converts optical images formed by the objective lenses into image signals. The imager 10 is mounted on the distal end side X1 on the upper surface 4*a* of the hard substrate 4.

The lens unit 11 has the plurality of objective lenses and a lens frame which holds the objective lenses, and the lens frame is fixed inside the distal end portion 200*a* of the insertion portion 200. The lens unit 11 is disposed such that an optical axis O2 intersects an endoscope axis O1 in a longitudinal direction of the endoscope (axial direction X). FIG. 2 illustrates a side viewing-type endoscope in which an intersection angle θ of the optical axis O2 of the lens unit 11 and the endoscope axis O1 is 90°, but it may also be a forward strabismus-type endoscope having the angle θ of 0° or larger and smaller than 90°.

For example, a CCD, a CMOS, or the like is used as the image capturing element 12, which is provided to capture images of an observation target. The image capturing element 12 is disposed such that an image capturing surface 12*a* is orthogonal to the optical axis O2 of the lens unit 11. That is, the image capturing surface 12*a* of the image capturing element 12 is disposed in a direction along the endoscope axis O1. A sensor electrode (not illustrated) is formed on a rear surface of the image capturing element 12. It is preferable that the image capturing element 12 be a chip size package (CSP) obtained by performing wiring, electrode formation, resin sealing, and dicing with respect to an image capturing element chip in a wafer state such that the size of the image capturing element chip ultimately becomes the size of the image capturing element 12 as it stands.

A cover glass (illustration omitted) for protecting the image capturing element 12 is bonded to an upper surface side of the image capturing element 12 using an optical adhesive. The lens unit 11 is disposed on the upper surface side of the image capturing element 12 with the cover glass therebetween.

The hard substrate 4 is a double-sided substrate having an imager mounting region 40 for disposing the imager 10 on the distal end side X1 on the upper surface 4*a* to which the image capturing surface 12*a* of the image capturing element 12 is directed. The lower surface 4*b* of the hard substrate 4 has an electrical portion mounting region 42 for mounting an electrical portion 14 such as electronic components on the distal end side X1, and the flexible board connection portion 41 (first connection part) for connecting the flexible board 5 on the proximal end side X2. The electrical portion 14 is disposed at a position on the rearward side opposite to the image capturing element 12 on the front side with the hard substrate 4 sandwiched therebetween.

The flexible board connection portion 41 is formed on a surface (lower surface 4*b*) vertically opposite to the imager mounting region 40. The hard substrate 4 extends parallel to the endoscope axis O1. That is, the imager mounting region 40 is parallel to the endoscope axis O1. The flexible board connection portion 41 is positioned in a substantially central portion in the extending direction on the hard substrate 4 in the axial direction X and is positioned on the proximal end side X2 from the imager mounting region 40.

The hard substrate 4 is a substrate having a higher bending strength than the flexible board 5, and a member of which the shape does not deform is employed. For example, a member such as a glass cloth composite, a ceramic, a thermosetting resin, or a thermoplastic resin is employed as the hard substrate 4.

The flexible board 5 has a hard substrate connection portion 50 which is connected to the flexible board connection portion 41 of the hard substrate 4 on an upper surface 5*a* on the distal end side X1 using a connection means such as press contact, solder fusion, connector connection, or the like. A cable connection portion 51 (second connection part) for connecting the cable 3 is provided on the proximal end side X2 on a lower surface 5b of the flexible board 5. The cable connection portion 51 is formed on a surface (lower surface 5b) vertically opposite to the hard substrate connection portion 50 and is at a position farther away to the proximal end side X2 than the flexible board connection portion 41. The cable connection portion 51 is a part including a solder portion for electrically connecting the cable core wire 31.

The flexible board 5 extends parallel to the endoscope axis O1. That is, the plate surface of the flexible board 5 is parallel to the plate surface of the hard substrate 4. The cable connection portion 51 is positioned on the proximal end side X2, and at least part (the entirety in the present embodiment) of the cable connection portion 51 is positioned on the lower surface 4b side of the hard substrate 4. The flexible board 5 has a shorter length in the axial direction X than the hard substrate 4, and a proximal end portion 5c of the flexible board 5 is positioned on the distal end side X1 from a proximal end portion 4c of the hard substrate 4.

The flexible board 5 is a soft substrate having a smaller bending strength than the hard substrate 4. For example, a member such as a glass cloth composite, a ceramic, a thermosetting resin, or a thermoplastic resin is employed as the flexible board 5.

Since the flexible board 5 can be bent, for example, it can be bent downward from the hard substrate connection portion 50 so that the position of the cable connection portion 51 can be set at a significant distance from the hard substrate 4.

The cable 3 is routed from a composite cable 30, and the cable core wire 31 is connected to the cable connection portion 51 of the flexible board 5. The composite cable 30 coats a plurality of cables 3 for inputting and outputting of signals, supplying of power, and the like in a bundled state by a shield coating 32. The cable core wires 31 of the plurality of cables 3 having the shield coating 32 removed therefrom are solder-connected to the cable connection portion 51 of the flexible board 5.

The cable core wire 31 is connected to the flexible board 5 in the cable connection portion 51 farther from the connection position of the imager 10 (imager mounting region 40) than the flexible board connection portion 41 in the axial direction X.

As described above, the image capturing unit 100 of the present embodiment has the imager 10, the cable 3 which coats the cable core wire 31 for performing at least one of inputting and outputting of signals between the imager 10 and the outside and supply of power to the imager 10 from the outside, the hard substrate 4 which connects the imager 10 to the upper surface 4a, and the flexible board 5 which is connected to the hard substrate connection portion 50 different from the connection position of the imager 10 (imager mounting region 40) on the lower surface 4b opposite to the upper surface 4a of the hard substrate 4. In the cable core wire 31, relative to the lower surface 4b of the hard substrate 4, at least part of the cable connection portion 51 connected to the flexible board 5 is positioned on a side (downward side) opposite to a direction in which the image capturing surface 12a of the imager 10 is directed.

Accordingly, in the present embodiment, the cable connection portion 51, which will become a solder connection part 51A of the cable core wire 31, is extended to the proximal end side X2 in the flexible board 5. Moreover, at least part of the cable connection portion 51 can be disposed on the rearward side (downward side) of the hard substrate 4. For this reason, the solder connection part 51A (cable connection portion 51) of the cable core wire 31 can be separated from an endoscope outer surface 200e in the vertical direction and can be more significantly separated from the circuit components of the imager 10 to the proximal end side X2. For this reason, an influence of static electricity on the imager 10 can be alleviated.

In addition, in the present embodiment, since the hard substrate 4 and the flexible board 5 are interposed between the cable connection portion 51, which will become the solder connection part 51A, and the endoscope outer surface 200e, and they act as a shield against static electricity, an influence of static electricity outside the endoscope can be alleviated.

In addition, in the image capturing unit 100 of the present embodiment, the cable core wire 31 is connected to the flexible board 5 in the cable connection portion 51 farther from the imager mounting region 40 than the flexible board connection portion 41. For this reason, the distance between the circuit components of the imager 10 and the cable connection portion 51 in the axial direction X can be further increased, and therefore an influence of static electricity on the imager 10 can be alleviated more effectively.

In addition, in the present embodiment, the cable connection portion 51 is formed on a surface (lower surface 5b) opposite to the hard substrate connection portion 50 (flexible board connection portion 41 side) in the flexible board 5. For this reason, since the hard substrate 4 and the flexible board 5 are interposed between the cable connection portion 51, which will become the solder connection part 51A, and the endoscope outer surface 200e, and they act as a shield against static electricity, an influence of static electricity outside the endoscope is alleviated. Moreover, since the solder connection part 51A is disposed on the lower surface 5b of the flexible board 5, the distance between the solder connection part 51A and the endoscope outer surface 200e in the vertical direction can be increased.

In addition, in the present embodiment, the hard substrate 4 is a substrate having a higher bending strength than the flexible board 5. For this reason, the imager 10 is reliably held by the hard substrate 4. Further, since the solder connection part 51A of the cable core wire 31 is fixed to the flexible board 5 which is deformable, the position of the solder connection part 51A (cable connection portion 51) in the vertical direction can be set to a desired position by bending the flexible board 5 such that it deforms.

In addition, in the present embodiment, the flexible board connection portion 41 of the hard substrate 4 is press-contact connection, connector connection, or solder connection having a smaller solder volume than the cable connection portion 51. With this constitution, an influence of static electricity on the connection part (the flexible board connection portion 41 and the hard substrate connection portion 50) between the hard substrate 4 and the flexible board 5 can be further reduced.

According to the image capturing unit 100 and the endoscope 2 of the present embodiment, the electrostatic resistance of the imager related components can be improved.

Hereinabove, an embodiment of the present invention has been described in detail with reference to the drawings. However, a specific constitution is not limited to this embodiment, and design change and the like within a range not departing from the gist of the present invention are also included. In addition, the constituent elements indicated in the embodiment and the modification example described above can be suitably combined and constituted.

Second Embodiment

Figure 3:
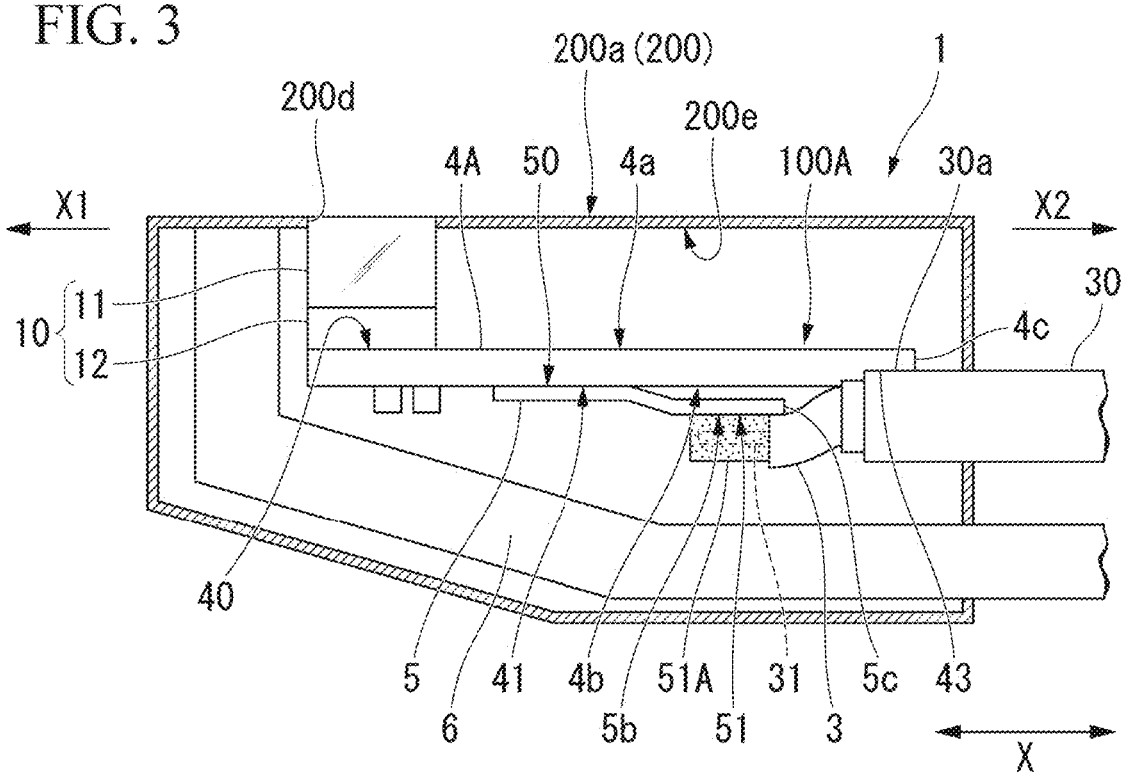
FIG. 3 is a cross-sectional view of an image capturing unit of an endoscope according to a second embodiment.

As illustrated in FIG. 3, in an image capturing unit 100A of an endoscope 2A according to a second embodiment, a hard substrate 4A (first substrate) has an accommodation recessed portion 43 (accommodation portion) which accommodates at least part of an end portion of the cable 3 in the proximal end portion 4c on the proximal end side X2. In the image capturing unit 100A of the second embodiment, the constitutions of the imager mounting region 40 and the flexible board connection portion 41 of the hard substrate 4A, and the constitutions of the hard substrate connection portion 50 and the cable connection portion 51 of the flexible board 5 are similar to those in foregoing first embodiment.

The accommodation recessed portion 43 has a shape in which the proximal end portion 4c has a reduced thickness by causing a part on the lower surface 4b of the proximal end portion 4c of the hard substrate 4A (a region on the proximal end side X2 from the flexible board connection portion 41) to be recessed in a recessed shape. The accommodation recessed portion 43 accommodates an upper part 30a of the composite cable 30 having the largest diameter. In this case as well, each of the cable core wire 31 having the shield coating removed therefrom is solder-connected to the flexible board 5 on the lower surface 4b side of the hard substrate 4A.

The accommodation recessed portion 43 may be entirely provided over the hard substrate 4A in a width direction (a direction orthogonal to the axial direction X in a plan view) or may also be an accommodation portion with a notch shape accommodating only the composite cable 30 to be accommodated.

In the image capturing unit 100A according to the second embodiment, the solder connection part 51A (cable connection portion 51) of the cable core wire 31 can be separated from the endoscope outer surface 200e in the vertical direction and can be more significantly separated from the circuit components of the imager 10 to the proximal end side X2. For this reason, an influence of static electricity on the imager 10 can be alleviated. Furthermore, in the second embodiment, since the hard substrate 4A has the accommodation recessed portion 43 accommodating at least part of the end portion of the cable 3 in the proximal end portion 4c, height dimensions between the hard substrate 4A and the composite cable 30 disposed below the hard substrate 4A in the vertical direction can be reduced. For this reason, the thicknesses of the composite cable 30 and the hard substrate 4A in the endoscope radial direction (vertical direction) can be reduced, and therefore the endoscope 2A can be reduced in diameter.

In addition, in the case of the second embodiment as well, similar to the first embodiment, the hard substrate 4A and the flexible board 5 are interposed between the cable connection portion 51, which will become the solder connection part 51A, and the endoscope outer surface 200e, and they act as a shield against static electricity, an influence of static electricity outside the endoscope can be alleviated.

Third Embodiment

Figure 4:
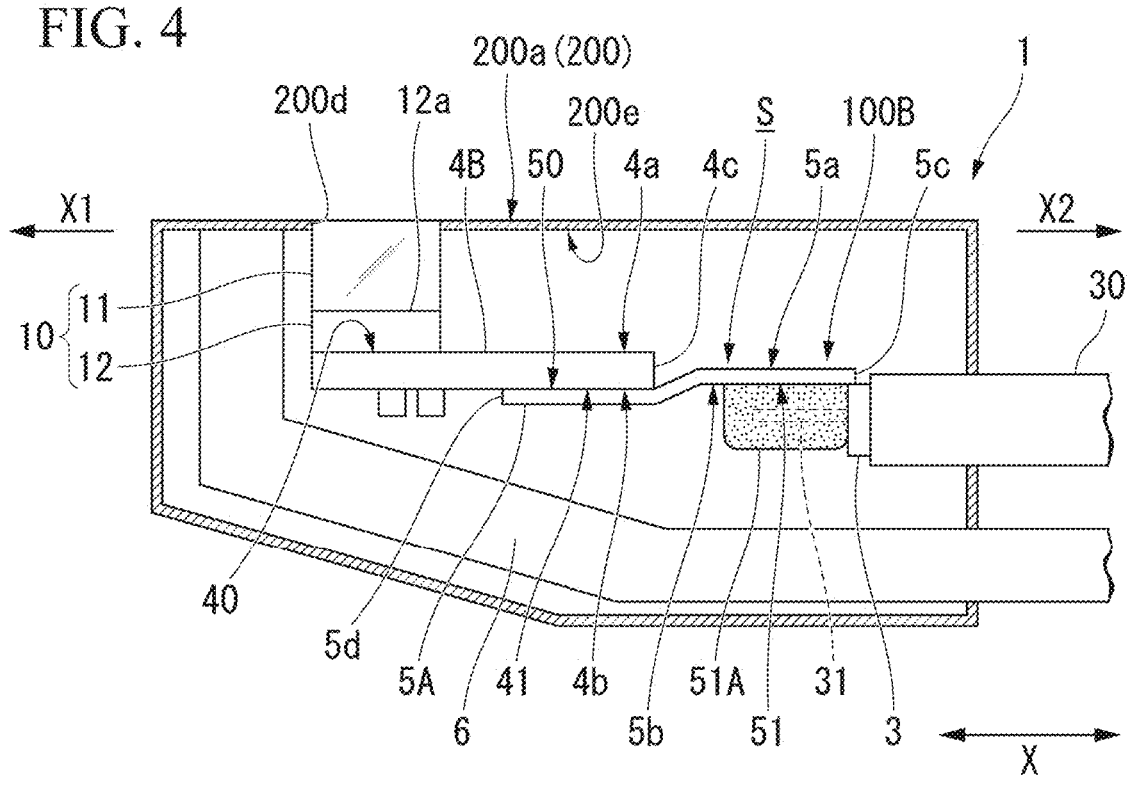
FIG. 4 is a cross-sectional view of an image capturing unit of an endoscope according to a third embodiment.

As illustrated in FIG. 4, an image capturing unit 100B of an endoscope 2B according to a third embodiment has a constitution in which the cable connection portion 51 (second connection part) of a flexible board 5A is formed at a position away from the proximal end portion 4c of a hard substrate 4B on the proximal end side X2 in the axial direction X.

The hard substrate 4B is set to have a shorter length extending in the proximal end side X2 than the hard substrate 4 (refer to FIG. 2) of the first embodiment described above.

The flexible board 5A is connected to the flexible board connection portion 41 of the hard substrate 4B on the distal end side X1 and is connected to the cable 3 in the cable connection portion 51 on the proximal end side X2. The flexible board 5A is bent toward the endoscope outer surface 200e side at a position not overlapping the hard substrate 4B in the vertical direction in a central portion in the axial direction. For this reason, in the flexible board 5A, the proximal end portion 5c on the proximal end side X2 is positioned in a direction in which the image capturing surface 12a of the imager 10 is directed, relative to a distal end portion 5d on the distal end side X1, in the vertical direction. That is, the position of the cable connection portion 51 which will become the solder connection portion and the position of the composite cable 30 including each of the cables 3 are set to positions close to the endoscope outer surface 200e on the opening portion 200d side.

In the cable core wire 31, at least part of the cable connection portion 51 including the solder connection portion connected to the flexible board 5A is positioned below the lower surface 4b of the hard substrate 4B.

In the image capturing unit 100B according to the third embodiment, the solder connection part 51A (cable connection portion 51) of the cable core wire 31 can be separated from the endoscope outer surface 200e in the vertical direction and can be more significantly separated from the circuit components of the imager 10 to the proximal end side X2. For this reason, an influence of static electricity on the imager 10 can be alleviated. Furthermore, in the third embodiment, since the end portion of the shield-coated cable 3 is disposed in a space S of the hard substrate 4B on the proximal end side X2, the thicknesses of the composite cable 30 and the hard substrate 4B in the endoscope radial direction (vertical direction) can be reduced, and therefore the endoscope 2B can be reduced in diameter.

In the third embodiment, in order to form the space S on the proximal end side X2 of the hard substrate 4B, a constitution further shortened in the axial direction X than the hard substrate 4 of the first embodiment described above (refer to FIG. 2) is adopted, but it is not limited to this. For example, a constitution in which a notch portion is provided by notching the proximal end portion 4c of the hard substrate 4 on the distal end side may be adopted. In this case, a constitution similar to that of the present third embodiment can be realized by disposing the cable connection portion 51 of the flexible board 5A in a space inside the notch portion of the hard substrate 4.

Fourth Embodiment

Figure 5:
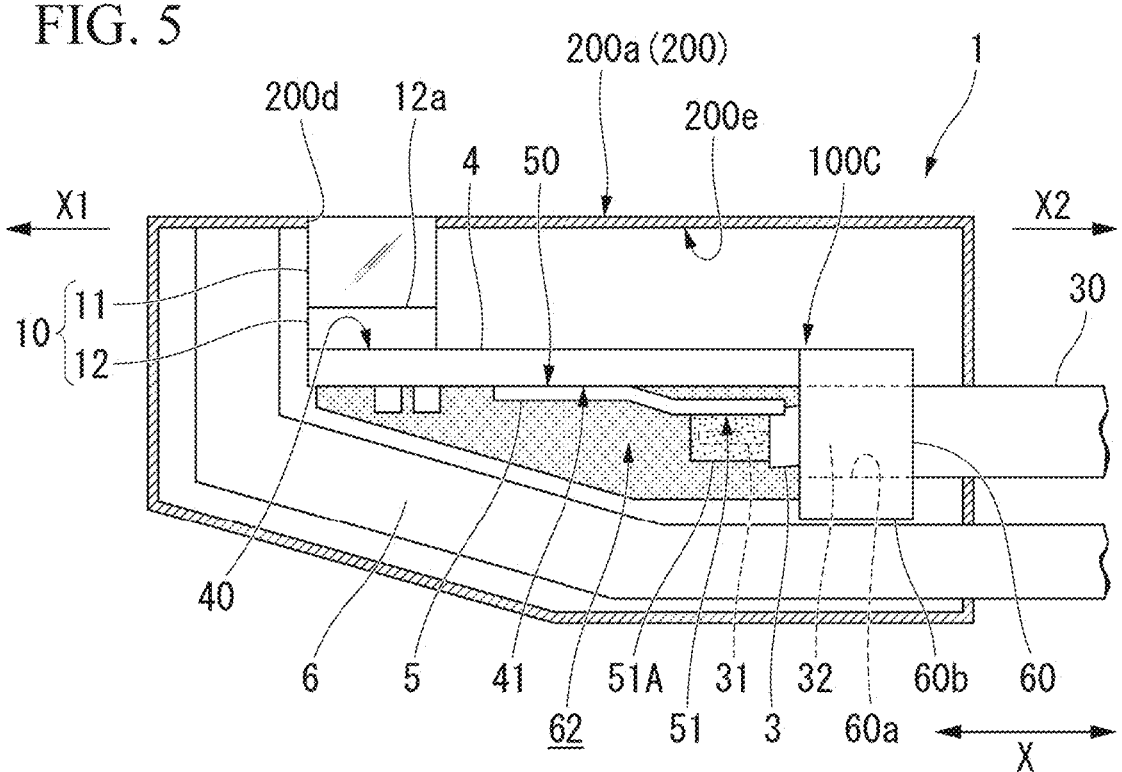
FIG. 5 is a cross-sectional view of an image capturing unit of an endoscope according to a fourth embodiment.

As illustrated in FIG. 5, an image capturing unit 100C of an endoscope 1C according to a fourth embodiment is constituted to have a holding member 60 of the light guide component 6 in the proximal end portion 4c on the proximal end side X2 in the hard substrate 4 of the first embodiment described above.

The holding member 60 holds the end portion of the cable 3 (here, a part of the shield coating 32) between the light guide component 6 and the hard substrate 4. The holding member 60 is fixed to the proximal end portion 4c of the hard substrate 4 and protrudes downward. The holding member 60 has a holding hole 60a penetrating it in the axial direction X. The shield coating 32 of the composite cable 30 is fixed to this holding hole 60*a* in a fitted state. Although FIG. 5 illustrates a state in which a lower end 60*b* of the holding member 60 is separated from the light guide component 6, it is fixed to the light guide component 6 or is supported in a non-bonding manner.

In addition, the space between the light guide component 6 and the hard substrate 4 is filled with a curable resin 62. That is, the hard substrate 4, the flexible board 5, and the cable core wire 31 are integrally provided by the curable resin 62.

In the image capturing unit 100C according to the fourth embodiment, since the solder connection portion of the cable connection portion 51 of the flexible board 5 is insulated by the hard substrate 4, the flexible board 5, the light guide component 6, and the curable resin 62, an influence of static electricity on the imager 10 can be alleviated.

Hereinabove, preferred embodiments of the present invention have been described, but the present invention is not limited to these embodiments. Addition, omission, replacement, and other changes of the constituents can be made within a range not departing from the gist of the present invention.

In addition, the present invention is not limited by the foregoing description and is only limited by the accompanying claims.

For example, the embodiments described above are targeted on side viewing-type endoscopes. However, as described above, since the object of the present invention is to improve the electrostatic resistance by increasing the distance between the imager 10 and the solder connection part 51A of the cable in the flexible board 5, the present invention is not limited to the side viewing-type and can also be applied to direct viewing-type endoscopes.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention can be applied to an image capturing unit and an endoscope.

What is claimed is:

1. An image capturing unit comprising:
an imager;
a cable that coats a cable core wire for performing at least one of inputting and outputting of signals between the imager and outside and supply of power to the imager from the outside;
a first substrate that connects the imager to a first surface with an image capturing surface of the imager directed to the first surface; and
a second substrate that is connected to a first connection part different from a connection position of the imager on a second surface opposite to the first surface of the first substrate, wherein in the cable core wire, relative to the second surface of the first substrate, at least part of a second connection part connected to the second substrate is positioned on a side opposite to a direction in which the image capturing surface of the imager is directed, and
the second connection part is at a position farther from the connection position of the imager than the first connection part and closer to the connection position of the imager than an end portion of the first substrate, and the second connection part is formed on a surface of the second substrate opposite to the first connection part such that the first substrate and the second substrate are interposed between the second connection part and the outside of the image capturing unit, and the first substrate and the second substrate act as a shield against static electricity from the outside.

2. The image capturing unit according to claim 1,
wherein the second substrate is a flexible board, and
the first substrate is a hard substrate having a higher bending strength than the second substrate.

3. The image capturing unit according to claim 1,
wherein the first substrate has an accommodation portion accommodating at least part of an end portion of the cable in an end portion on an insertion portion proximal end side.

4. The image capturing unit according to claim 1,
wherein in the second substrate, an end portion on the insertion portion proximal end side is positioned in a direction in which the image capturing surface of the imager is directed, relative to an end portion on the insertion portion distal end side.

5. The image capturing unit according to claim 1 further comprising:
a light guide component that guides light emitted to an image capturing target of the imager,
wherein the first substrate has a holding member of a light guide component in an end portion on an insertion portion proximal end side, and
the holding member holds an end portion of the cable between the light guide component and the first substrate.

6. The image capturing unit according to claim 1,
wherein the second connection part is a solder joint.

7. The image capturing unit according to claim 1,
wherein the first connection part is a press-contact connection, a connector connection, or a solder connection having a smaller solder volume than the second connection part.

8. An endoscope comprising:
the image capturing unit according to claim 1 that is provided in an endoscope insertion portion distal end.

9. The endoscope according to claim 8,
wherein the imager is disposed with the image capturing surface directed in a direction intersecting a longitudinal direction of an insertion portion.

10. The image capturing unit according to claim 1,
wherein the first substrate, the second substrate and the second connection part are overlapped with one another such that the second connection part are covered by the first substrate and the second substrate.

* * * * *